June 11, 1963   B. E. AGNER   3,092,897
STATOR CONFIGURATION FOR WELDING PURPOSES
Filed March 13, 1959

INVENTOR.
Bengt E. Agner
BY

United States Patent Office 3,092,897
Patented June 11, 1963

3,092,897
STATOR CONFIGURATION FOR WELDING PURPOSES
Bengt E. Agner, 9100 Avers Ave., Evergreen Park, Ill.
Filed Mar. 13, 1959, Ser. No. 799,160
4 Claims. (Cl. 29—155.5)

This invention relates in general to improvements in the art of fabricating articles composed of a plurality of united sheets of material and, more particularly, to lamination-assemblies for electric machines such as dynamo-electric machines.

The invention is primarily directed to an improved stator construction for motors and generators and hence will herein be illustratedly described with respect to such embodiment wherein the stator, when assembled, provides a centrally disposed hollow core of cylindrical configuration to accommodate the rotor.

Various means have heretofore been used for maintaining stator laminae in assembled relationship. The two principal methods are riveting and welding, and various modifications have been developed within those two broad methods.

One of the stator riveting methods is disclosed in detail in U.S. Patent 2,556,013, issued June 5, 1951 to Charles A. Thomas. A stator welding operation is fully disclosed in U.S. Patent 2,845,555, issued July 28, 1958 to David E. Carpenter and Arland F. Palmer.

The present invention is particularly adapted to the welding method.

The disclosure of the above mentioned U.S. Patent 2,845,555 aptly illustrates a basic difficulty with present welding methods, namely, they involve the application of pressure to the assembled laminae in a direction from the peripheral area of the stator toward the hollow rotor core. This pressure, which can be on the order of 1,000 pounds per linear inch, will, unless counteracting measures are taken, distort the assembly so that the rotor area will not be of the desired cylindrical configuration and hence useless. This tendency toward distortion of the stator during the assembly operation has heretofore been counteracted by the insertion of a jig or expanding mandrel in the center section of the assembly before the pressure is applied. This, however, requires a time-consuming and often difficult operation of removing the jig, or mandrel, after the welding operation is finished.

The principal object of this invention is to provide an improved structure of the type above described in a simple but effective method of assembly in which the above noted difficulties are eliminated.

A further object is to provide an improved method of electrically welding laminated stators whereby distortion is avoided and the welding operation is made more efficient by providing a more direct and deeper path for the welding current.

These and other objects will more fully appear with reference to the accompanying drawing wherein.

Figures 1, 2, 3:
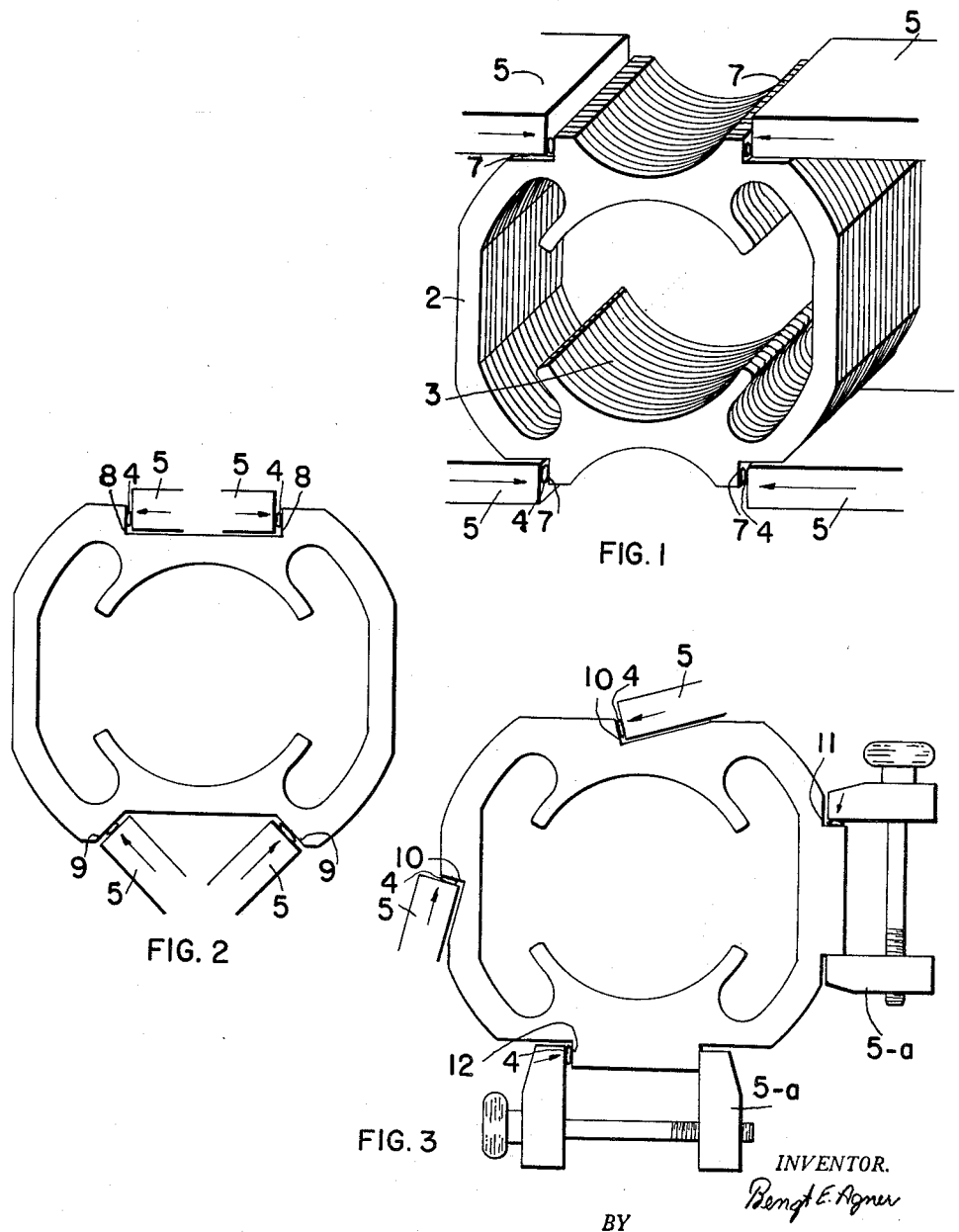
FIG. 1 is a view of a stack of laminations constructed in accordance with the present invention and assembled preparatory to the welding operation.
FIGS. 2 and 3 are plan views of laminations illustrating modified forms of the invention as illustrated in FIG. 1.

According to the prior art method upon which the present invention is an improvement, the stator is formed in well known manner by laminating a plurality of relatively thin arcuate flat sheets which are stamped or otherwise formed of magnetic material, preferably steel, in such configuration that when laminated they will form the stator having a centrally disposed hollow core (designated by reference character 3 in FIG. 1) which is substantially cylindrical in configuration and is adapted to house the rotor (not shown). A welding rod, or other fusible metal element, is placed transverse the peripheries of the lamination at each of the oppositely disposed welding areas, which are simply strips on the periphery of the stator and, in well known manner, oppositely disposed welding electrodes, are simultaneously applied to the welding rods with considerable pressure (e.g. 1,000 pounds per linear inch) and the welding current applied. To prevent deformation of the stator area in the prior art method a jig or expandable mandrel is inserted in the rotor area. This jig must ultimately be removed, which, as above stated, may be both time-consuming and difficult.

FIG. 1 illustrates one embodiment of the present invention whereby the need for a jig, mandrel or other support in the rotor area is eliminated.

As will be seen, each of the identical plates 2 which form the lamination is provided with oppositely disposed welding shoulders 7 extending radially, or substantially radially, from the peripheral edge of the plate. When the welding rods or equivalent fusible strips 4 are thereupon placed across the welding shoulders 7 and the welding electrodes 5 are simultaneously applied under pressure, as above described, it will be readily apparent that the pressure, instead of being toward or substantially toward the cylindrical rotor area 3 will, instead, be substantially tangential thereto and hence in a direction which will not tend to deform the rotor area. Furthermore, as an added benefit, the path of the welding current from one electrode to the electrode in the oppositely disposed welding shoulder is more direct, shorter and deeper in the laminations than with the prior art operation, all of which makes for a better bond.

FIG. 2 illustrates a modified form of the welding shoulders wherein they may either be squarely inset in relatively close association, as illustrated by reference characters 8, or they may be similarly positioned at an angle as illustrated by reference characters 9.

FIG. 3 illustrates a modified form of radial welding shoulder in which the shoulders are inset instead of projecting and disposed so that the pressure from the electrodes 5 will be substantially tangential to the periphery of the stator. Three alternate modifications are illustrated in FIG. 3. The oppositely disposed shoulders 10 could, if desired, be 180 degrees apart and be used exclusively, or any desired number of the same type of shoulder could be used, depending upon requirements. The shoulders 11 and 12, to which a clamp type electrode (5-a) is used, are illustrative of further modifications of my invention which, though not preferred from a practical standpoint, may be of value under certain conditions.

The peripheral welding shoulders, as above described, provide a simple but extremely effective solution to the problem of deformation during the resistance welding operation. Obviously the same advantages will be obtained whether the welding shoulders project in a true radius from the longitudinal axis of the stator, as shown in FIG. 3, or are inclined as much as 45° off a true radius as shown in FIGS. 1 and 3. Indeed, the shoulders could be acutely angled like sharp ratchet teeth for reception of a correspondingly tooth shaped electrode. It is conceivable that similar advantages could be obtained if the shoulders were mere openings adapted to receive the welding substance and electrodes against which the desired pressure could be exerted. The essential factor is that the projected line of pressure exerted by the welding electrodes must not enter into and hence tend to deform the centrally disposed rotor area. In other words, the pressure must be substantially tangential to the cylindrical core area or, more specifically, the rotor area. The phrase "in a direction substantially tangential to the rotor area" (or "the core area"), as used herein and in the appended claims, means that the pressure is confined to the solid area of the laminations and no effective portion of the welding pressure shall extend to the core area.

It is the intention to cover all modifications or equivalents coming within the hereto appended claims. Other welding expedients besides welding rods may, of course, be used in the welding operation and it is intended that all such equivalents shall be included within the phrase "welding rods" as used.

I claim:

1. In the method of producing a metal unit having a centrally disposed cylindrical core area by superimposing a plurality of substantially identical laminating plates and electrically welding them by means of passing a current through welding rods held under pressure against the peripheries of the assembled laminating plates, the improvement which comprises providing the peripheral edge of the assembled laminating plates with oppositely disposed welding shoulders extending across the said peripheral edge, placing a fusible metal welding element across the welding shoulders and then applying the welding pressure of the electrodes on said shoulders and fusible metal element and in a direction substantially tangential to the cylindrical core area and transverse the longitudinal axis of said core area, said core area requiring no support against the welding pressure during the welding operation.

2. In the method of producing a metal unit having a centrally disposed cylindrical core area by superimposing a plurality of substantially identical laminating plates and electrically welding them by means of passing a current through welding rods held under pressure against the peripheries of the assembled laminating plates, the improvement which comprises providing the peripheral edge of the assembled laminating plates with a pair of oppositely disposed welding shoulders extending across said peripheral edge and adapted to receive the fusible welding element, placing a fusible metal welding element across each of the welding shoulders and then applying the welding pressure of the electrodes on each of said fusible metal elements in a circumferential direction toward the oppositely disposed shoulder, while applying the welding current to effect the welding of each strip to the shoulder on which it is placed, said core area requiring no support against the welding pressure during the welding operation.

3. In a method of producing a metal unit having a centrally disposed cylindrical core area by superimposing a plurality of substantially identical laminating plates and electrically welding them by means of passing a current through welding rods held under pressure against the peripheries of the assembled laminating plates, the improvement which comprises providing the peripheral area of the superimposed laminating plates with a pair of spaced and oppositely disposed welding shoulders extending transversely of the laminating plates, placing a fusible welding strip along the length of each such shoulder, pressing a welding electrode against the welding strip in each shoulder in a direction along the periphery of the laminating plates and toward the oppositely disposed shoulder and then applying the welding current to effect the welding of each strip to the shoulder, said core area requiring no support against the welding pressure during the welding operation.

4. Method of assembling a stator for electric motors and generators which comprises superimposing a plurality of substantially identical laminating plates made of magnetizable material, said plates formed to provide, when superimposed, a centrally disposed hollow core area and peripheral shoulders extending substantially parallel to the longitudinal axis of said core area, each said shoulder adapted to receive a fusible welding element and a welding electrode, placing a fusible metal element transversely across each such shoulder and then passing a welding current through the fusible metal welding element and shoulder area while applying pressure thereto in a direction substantially toward the oppositely disposed shoulder and tangential to the longitudinal area of said core area, said core area requiring no support against the welding pressure during the welding operation.

References Cited in the file of this patent

UNITED STATES PATENTS

| | | |
|---|---|---|
| 1,980,026 | Wood | Nov. 6, 1934 |
| 2,323,114 | Bradford et al. | June 29, 1943 |
| 2,497,114 | Curry | Feb. 14, 1950 |
| 2,560,560 | Doherty | July 17, 1951 |
| 2,783,404 | Appenzeller | Feb. 26, 1957 |
| 2,790,918 | Goran | Apr. 30, 1957 |
| 2,896,311 | Stafford et al. | July 28, 1959 |
| 2,910,767 | Loy | Nov. 3, 1959 |